US012726560B2

(12) United States Patent
Cai

(10) Patent No.: US 12,726,560 B2
(45) Date of Patent: Sep. 1, 2026

(54) MOBILE PHONE CASE WITH RGB LIGHT MODULE

(71) Applicant: Shenzhen DeOne Innovation Technology Co., ltd, Shenzhen Guangdong (CN)

(72) Inventor: Jiongjun Cai, Shenzhen Guangdong (CN)

(*) Notice: Subject to any disclaimer, the term of this patent is extended or adjusted under 35 U.S.C. 154(b) by 384 days.

(21) Appl. No.: 18/533,289

(22) Filed: Dec. 8, 2023

(65) Prior Publication Data

US 2025/0023972 A1 Jan. 16, 2025

(30) Foreign Application Priority Data

Jul. 11, 2023 (CN) ........................ 202321814574.3

(51) Int. Cl.
*H04M 1/02* (2006.01)
*H04B 1/3888* (2015.01)
*H04M 1/22* (2006.01)

(52) U.S. Cl.
CPC ....... *H04M 1/0283* (2013.01); *H04M 1/0249* (2013.01); *H04M 1/0277* (2013.01); *H04M 1/22* (2013.01)

(58) Field of Classification Search
None
See application file for complete search history.

(56) References Cited

U.S. PATENT DOCUMENTS 6,611,697 B1 * 8/2003 Ewing ............... H04M 1/72409 455/575.1
8,583,198 B1 * 11/2013 Coverstone .......... H04B 1/3888 455/575.8
10,133,529 B2 * 11/2018 Lim ...................... H04M 1/724
2012/0052929 A1 * 3/2012 Thammasouk ..... H04M 1/0283 455/575.1
2013/0260825 A1 * 10/2013 Hagenstad ........... G08B 15/004 455/556.1
2019/0341957 A1 * 11/2019 Coverstone ......... H04M 1/0249

* cited by examiner

*Primary Examiner* — Pablo N Tran

(57) ABSTRACT

A mobile phone case with RGB light module is disclosed. The mobile phone case is fitted to a mobile phone on a front side and configured with a sandwich layer inside. The sandwich layer is configured with a light-emitting component that including a PCB board, light-emitting members and a signal transceiver. The light-emitting members are all electrically connected to the PCB board, and light-emitting parts of the light-emitting members are disposed towards the back and/or a side of the mobile phone case. The mobile phone case can achieve advantages of linked flashing by providing light-emitting members on both the back and the side of the mobile phone case as well as controlling the light-emitting members via the mobile phone.

12 Claims, 6 Drawing Sheets

MOBILE PHONE CASE WITH RGB LIGHT MODULE

TECHNICAL FIELD

The present application relates to the technical field of mobile phone cases, and specifically to a mobile phone case with RGB light module.

BACKGROUND

RGB color mode is a color standard in the industry, it is through changes of three color channels of red (R), green (G), and blue (B) and their superposition between each other to get a variety of colors. That is, RGB is colors representing three channels of the red, green and blue, this standard includes almost all colors that human vision may perceive and is one of the most widely used color systems.

An existing mobile phone case is configured with an RGB color system, which enable the mobile phone to flash multi-colored lights under different usage scenarios. However, such mobile phone case is often only configured with a light-emitting region on one side, and the light-emitting region provided on the side cannot be arranged in a large area. In addition, if the light-emitting region is provided on a back of the mobile phone case, which would make a light emitted by a light-emitting member cannot be easily perceived to a user when the mobile phone case is placed face up on a plane.

SUMMARY

In view of defects and deficiencies of existing technologies, the present disclosure aims to provide a mobile phone case with RGB light module, which can achieve advantages of linked flashing by providing light-emitting members on both back and side of the mobile phone case as well as controlling the light-emitting members via the mobile phone.

To realize above objectives, the present disclosure adopts following technical solutions. Specifically, in some embodiments of the present disclosure, a mobile phone case with RGB light module is provided. The mobile phone case fits to a mobile phone on a front side and configured with a sandwich layer inside, the sandwich layer is configured with a light-emitting component, and the light-emitting component includes a PCB board, light-emitting members, and a signal transceiver. The light-emitting members are provided with several and all electrically connected to the PCB board, and light-emitting parts of the light-emitting members are disposed towards a back and/or a side of the mobile phone case. The signal transceiver is electrically connected to the PCB board and signal connected to a mobile phone signal. The signal transceiver is configured to receive command information of the mobile phone and send it to the PCB board, and the PCB board is configured to control light-emitting modes of all the light-emitting members via the command information.

In some embodiments of the present disclosure, there are provided with three light-emitting members named a first light-emitting member, a second light-emitting member and a third light-emitting member. A light-emitting part of the first light-emitting member is disposed towards the side of the mobile phone case, and light-emitting parts of the second and third light-emitting members are disposed towards the back of the mobile phone case.

In some embodiments of the present disclosure, a light source of each light-emitting member is an LED light electrically connected to the PCB board, and each light-emitting part is a light guide plate for converting a side light emitted by the LED light into an area light.

In some embodiments of the present disclosure, one end of the light guide plate of the first light-emitting member is configured on the PCB board and the other end is configured to extend out of the side of the mobile phone case.

In some embodiments of the present disclosure, the signal transceiver is Bluetooth.

In some embodiments of the present disclosure, the mobile phone case is configured with a mounting groove, and the light-emitting component is assembled in the mounting groove.

In some embodiments of the present disclosure, the mounting groove is covered with a transparent cover covering the light-emitting component, and the transparent cover and the mounting groove are formed into the sandwich layer.

In some embodiments of the present disclosure, the mounting groove is internally configured with a power supply electrically connected to the PCB board.

In some embodiments of the present disclosure, the mounting groove is configured with a magnetic region inside, and the magnetic region is configured to assist an external power supply device to align the mobile phone for wireless charging.

In some embodiments of the present disclosure, the magnetic region is a magnet.

With adoption of the above technical solutions, the present disclosure has at least following advantages. The mobile phone case fits to the mobile phone on the front side to achieve the mobile phone case being fixed on the mobile phone, and the mobile phone case is provided with the light-emitting component on the back. The light-emitting component includes the PCB board, the light-emitting members and the signal transceiver. There are provided with a plurality of light-emitting members that all electrically connected to the PCB board, with the light-emitting parts of some light-emitting members are disposed towards the back of the mobile phone case, and the light-emitting parts of the other light-emitting members are disposed towards the side of the mobile phone case, so that the side of the mobile phone case can provide a light indication when the mobile phone fitted with the mobile phone case is placed face up on the plane. The signal transceiver is electrically connected to the PCB board and connected to the mobile phone signal. The signal transceiver is configured to receive command information of the mobile phone and send it to the PCB board, and the PCB board is configured to control light-emitting modes of all the light-emitting members via the command information. Therefore, the mobile phone case of the present disclosure can achieve advantages of linked flashing by providing light-emitting members on both the back and the side of the mobile phone case as well as controlling the light-emitting members via the mobile phone.

BRIEF DESCRIPTION OF THE DRAWINGS

In order to more clearly illustrate the technical solutions in embodiments of the present disclosure and the existing technologies, the following will briefly describe accompanying drawings that need to be used in the description of the embodiments or the existing technologies. It will be obvious that the accompanying drawings in the following description are only some of the embodiments of the present disclosure, and for one person of ordinary skill in the art, other accompanying drawings can be obtained based on these drawings without paying creative labor.

Figure 1:
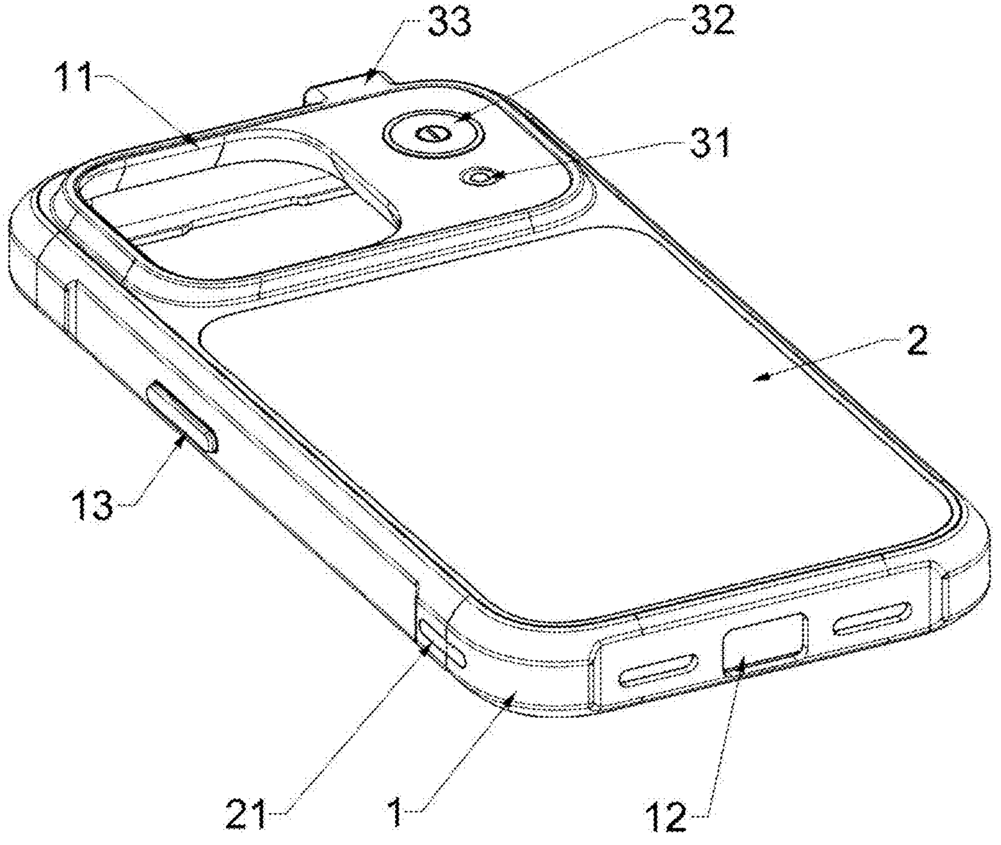
FIG. 1 is a structural schematic diagram of a mobile phone case with RGB light module in accordance with some embodiments of the present disclosure.

In the drawings, reference signs are as follows. 1. mobile phone case, 11. camera opening, 12. charging port, 13. keycap, 14. mounting chamber, 141. connecting slot, 15. exposed hole, 16. mounting groove, 161. power groove, 162. through hole, 2. light-emitting component, 21. first light-emitting member, 22. first PCB board, 22. IED light, 222. second light-emitting member, 223. third light-emitting member, 23. transparent cover, 24. mounting frame, 241. locating slot, 242. first through hole, 243. magnetic slot, 244. power chamber, 245. cavity, 25. magnetic region, 26. power supply, 27. pattern layer, 271. location hole, 272. second through hole, 31. indicator light, 32. button, 33. charging socket, 34. lower cover, 35. second PCB board, 36. conductive sheet.

DETAILED DESCRIPTION OF THE EMBODIMENTS

The present disclosure will be described in further detail below in conjunction with the accompanying drawings.

Specific embodiments below are only an explanation of the present disclosure, which is not a limitation of the present disclosure, after reading of this specification the person of ordinary skill in the art can make modifications to the embodiments without creative contribution as needed, which are protected by the patent law as long as it falls within the scope of the claims of the present disclosure.

Figure 2:
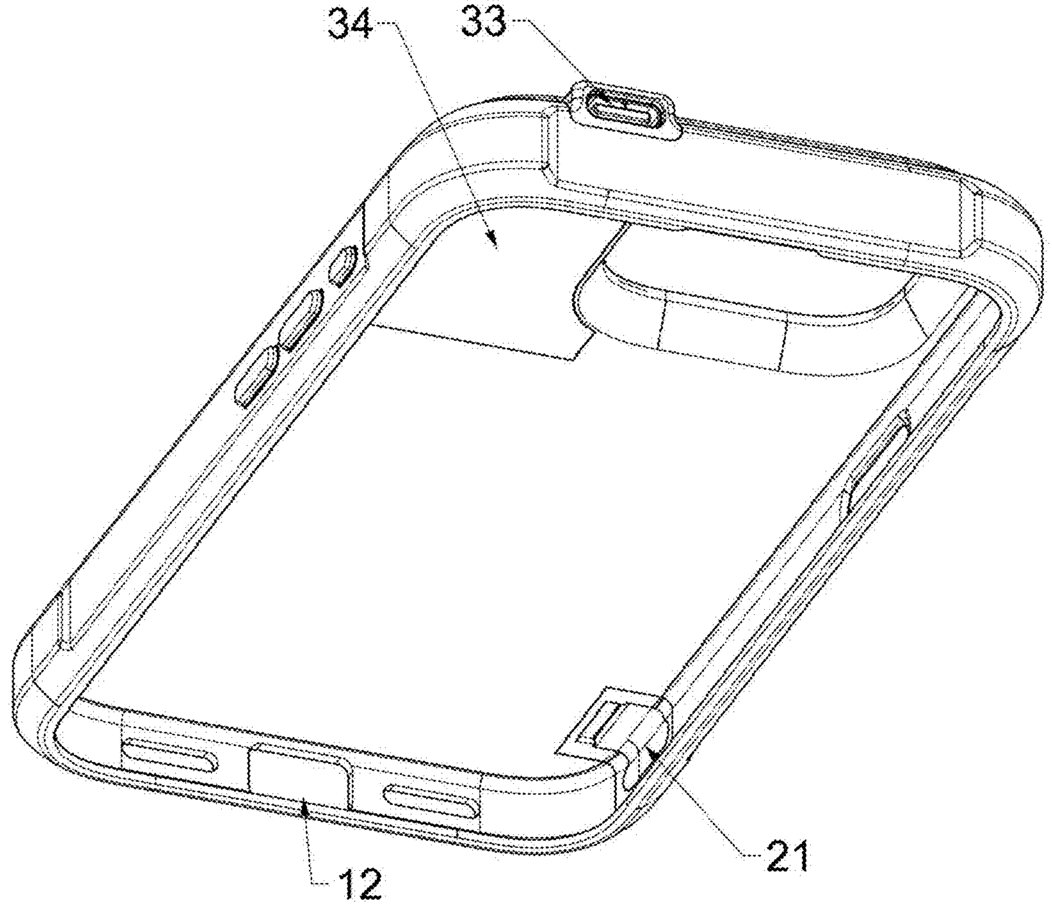
FIG. 2 is a bottom stereoscopic view of the mobile phone case with RGB light module in accordance with some embodiments of the present disclosure.

In some embodiments of the present disclosure, a mobile phone case with RGB light module is provided. Referring to FIG. 1 and FIG. 2, the device of the present disclosure includes a mobile phone case 1, the mobile phone case 1 at a lower portion is configured with a camera opening 11 for exposing mobile phone cameras, and herein a size and a position of the camera opening. 11 are adapted to the mobile phone cameras. The mobile phone case 1 at a lower end is configured with a charging port 12 exposed for a charging slot of the mobile phone, so that the mobile phone can be charged by a charging cable. The mobile phone case 1 on its side is configured with a plurality of keycaps 13, disposed corresponding to keys on the side of the mobile phone, which are used to protect the keys without affecting a normal use of the keys. The mobile phone case 1 on a front side is used to fit with the back of the mobile phone, specifically, the mobile phone case 1 is configured with a panel and a side frame surrounded at edges of the panel, both of which constitutes a shell-like case for the mobile phone to be put into. Materials of the mobile phone case 1 may be thermoplastic polyurethane elastomers, a polycarbonate materials or glass materials.

In some other embodiments of the present disclosure, the mobile phone case 1 is only configured with one panel, and the panel fits to the back of the mobile phone.

Figure 3:
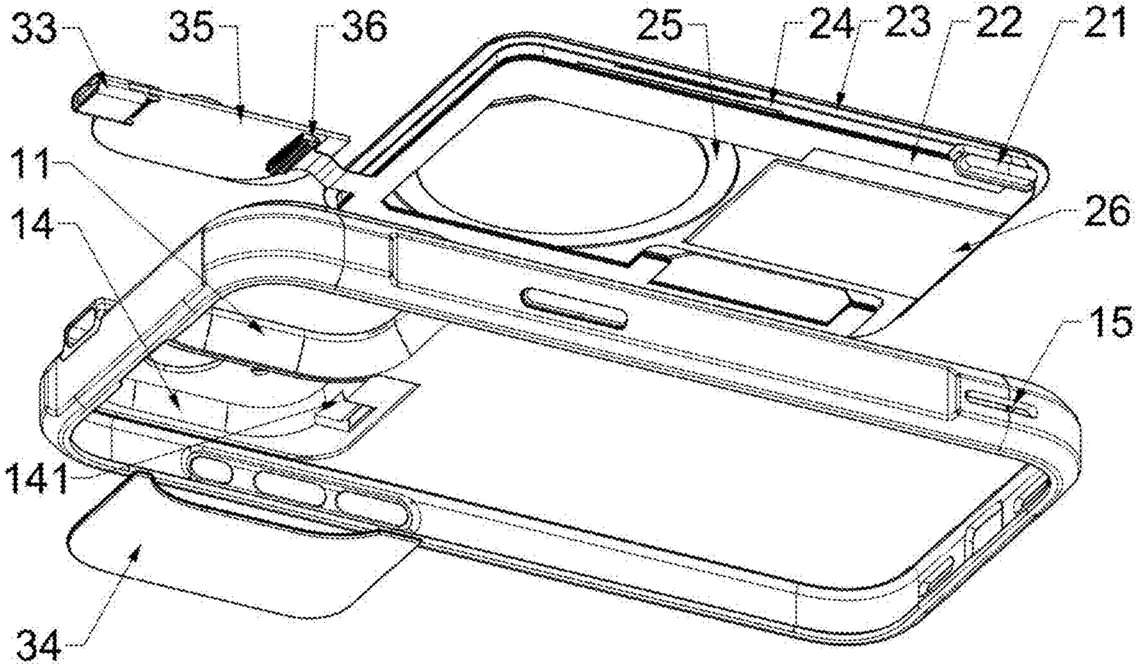
FIG. 3 is an exploded view of part structures of the mobile phone case with RGB light module in accordance with some embodiments of the present disclosure.
Figure 4:
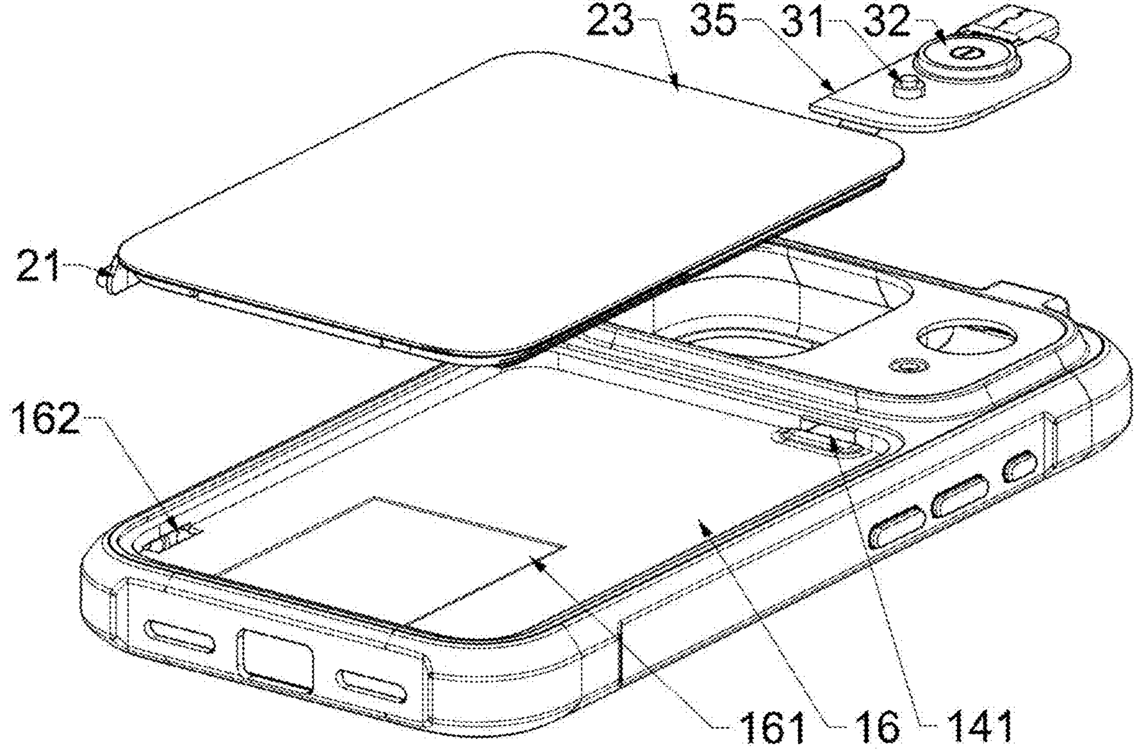
FIG. 4 is a top stereoscopic view corresponding to FIG. 3.

In some preferred embodiments of the present disclosure, referring to FIG. 3 and FIG. 4, the mobile phone case 1 is configured with a sandwich layer on its back, and the sandwich layer is configured with a light-emitting component 2 inside that can be associated with the mobile phone. When receive an incoming call, notification and charging, or lock screen, the light-emitting component 2 may flash light for interaction. The light-emitting component 2 includes a PCB board and light-emitting members. The PCB board is provided on the back of the mobile phone case 1, and the light-emitting members are provided with several that all electrically connected to the PCB board, thus the PCB board can control flash modes, on and off of the light-emitting members. Herein light-emitting parts of some light-emitting members are disposed towards the back of the mobile phone case 1, and light-emitting parts of the other light-emitting members are disposed towards the side of the mobile phone case 1, so that the side of the mobile phone case can provide a light indication to alert the incoming call or notification when the mobile phone fitted with the mobile phone case 1 is placed face up on the plane. When both the sides and the back of the mobile phone case 1 can be illuminated, the illuminated areas can then have linkage to improve diversity of an overall lighting effect.

It should be added that the light-emitting component 2 is further configured with a signal transceiver integrated on the PCB board and electrically connected to the PCB board, the signal transceiver is connected to a mobile phone signal, and then the mobile phone sends command information to the signal transceiver. The signal transceiver is configured to receive the command information and send it to the PCB board, and the PCB board is configured to control light-emitting modes of all light-emitting members via the command information. In the embodiments, the signal transceiver is Bluetooth. In some other embodiments, the signal transceiver is WIFI or NFC.

Specifically, the light-emitting modes include a flashing or off mode, a burst flashing mode, a gradient flashing mode, and color lights cycle flashing mode in a unit of individual light-emitting member, as well as the flashing or off mode and a combined flashing mode in a unit of several light-emitting members.

Figure 5:
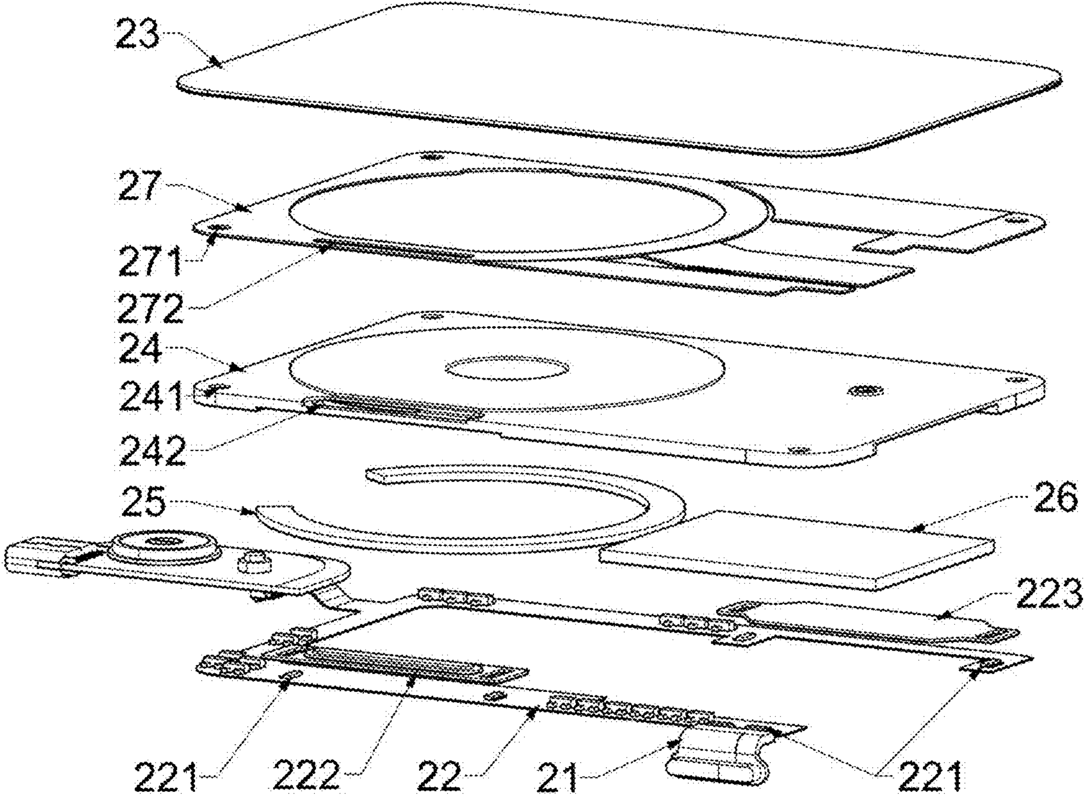
FIG. 5 is an exploded view of a light-emitting component in accordance with some embodiments of the present disclosure.

Referring to FIG. 4 and FIG. 5, the mobile phone case 1 is configured with a mounting groove 16 for the light-emitting component 2 to be embedded, and the mounting groove 16 is covered with a transparent cover 23 covering at its opening. The transparent cover 23 and the mounting groove 16 are formed the sandwich layer, the transparent cover 23 is configured to allow the light generated by the light-emitting members provided on the back to penetrate, thus an overall luminous effect of the light-emitting members cannot be affected in a premise of protecting the light-emitting component 2.

In some preferred embodiments of the present disclosure, each light-emitting member includes a light-emitting part and a light source, the light source is disposed on the PCB board. The whole light-emitting part will give out light after irradiation by the light source to form a block light source, specifically the light source is an LED light 221 integrated on the PCB board, and the light-emitting part is a light guide plate.

It should be noted that there are provided with three light-emitting members named a first light-emitting member 21, a second light-emitting member 222 and a third light-emitting member 223. Herein the first light-emitting member 21 is arranged at the lower end of the back of the mobile phone case 1, the second light-emitting member 222 is arranged a middle of the back of the mobile phone case 1 and near edges of the back of the mobile phone case 1. The third light-emitting member 223 is arranged at the lower portion of the back of the mobile phone case 1 and near the edges of the back of the mobile phone case 1. In the embodiments of the present disclosure, the second light-emitting member 222 is arranged on a left side of the back of the mobile phone case 1, and the third light-emitting member 223 is arranged on a right side of the back of the mobile phone case 1.

In some embodiments of the present disclosure, a first end of the light guide plate of the first light-emitting member 21 is illuminated by the LED light 221, and the light guide plate is bending set. A through hole 162 is provided in the mounting groove 16 for the light guide plate to pass through. The mobile phone case 1 is configured with an exposed hole 15, the light guide plate first passes through the through hole 162 and then into the exposed hole 15, at this moment a second end of the light guide plate refracts the light received from the first end, thus the light guide plate in the exposed hole 15 can be flashed.

In some embodiments of the present disclosure, the LED light 221 of the second light-emitting member 222 is arranged on the PCB board, which in particular providing two groups. The light guide plate of the second light-emitting member 222 is arranged in a shape of strip, two groups of the LED light 221 are arranged on both sides of the light guide plate, and a side light source emitted therefrom irradiates both ends of the light guide plate, so that the whole light guide plate can emit a uniform area light. A lug boss is provided on the light guide of the second light-emitting member 222, and the lug boss is also of guiding materials.

In some embodiments of the present disclosure, the LED light 221 of the third light-emitting member 223 is arranged on the PCB board, which in particular providing two groups. The light guide plate of the third light-emitting member 223 is arranged in the shape of strip, two groups of the LED light 221 are arranged on both sides of the light guide plate, and the side light source emitted therefrom irradiates both ends of the light guide plate, so that the whole light guide plate can emit the uniform area light.

It should be noted that, the second light-emitting member 222 and the third light-emitting member are provided with mounting holes on both sides of light guide plates near their LED lights 221, and the LED lights 221 are arranged in the mounting holes to position the light guide plates thereof, thereby preventing the light guide plates from shifting and affecting an light flashing effect.

Figure 6:
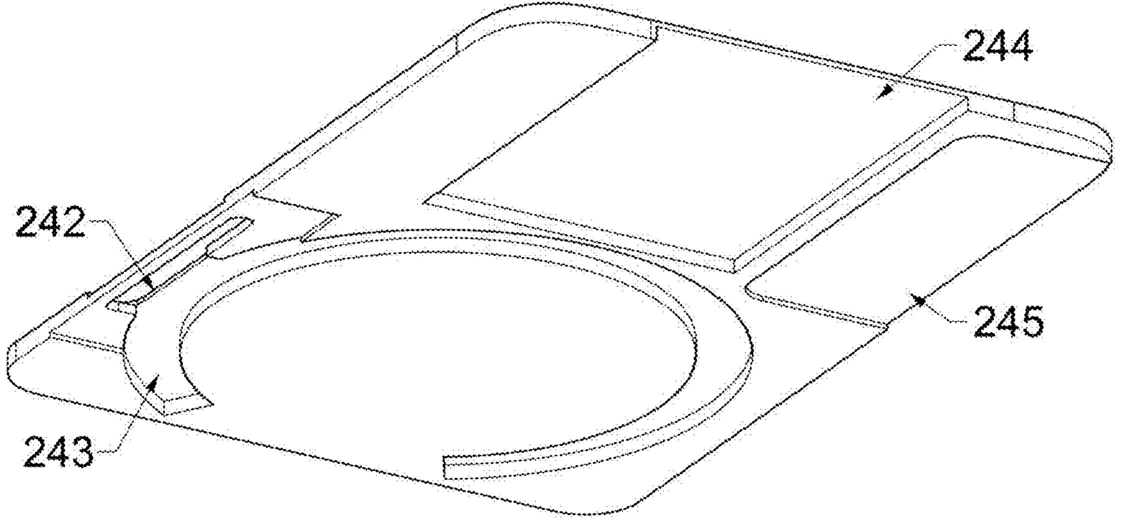
FIG. 6 is a structural schematic diagram of a mounting frame in accordance with some embodiments of the present disclosure.

In some preferred embodiments of the present disclosure, referring to FIG. 4 to FIG. 6, a mounting frame 24 is provided in the mounting groove 16, and the PCB board is provided between bottoms of the mounting frame 24 and the mounting groove 16. A power supply 26 is also provided between the mounting groove 16 and the mounting frame 24, which is electrically connected to the PCB board, and the power supply 26 is configured to supply power for the whole RGB mobile phone case 1. The mounting groove 16 is further configured with a magnetic region 25 used by an external electronic device to align a wireless charging area on the mobile phone. A pattern layer 27 is provided between a top of the mounting frame 24 and a transparent plate, the pattern layer 27 is used to decorate the back of the mobile phone case 1.

It should be noted that, a battery jar is opened on the mounting groove 16, and a power chamber 244 corresponding to the battery jar is provided on the mounting frame 24. The power supply 26 is sandwiched between the battery jar and the power chamber 244. The power supply 26 is a rechargeable battery with a battery capacity of 100 mAh.

In some embodiments of the present disclosure, the magnetic region 25 is a magnet, a magnetic slot 243 is opened at the bottom of the mounting frame 24, and the magnetic slot 243 is curved. The magnetic may be a plurality of magnets lined up in the magnetic slot 243 or a whole magnet adapted to a shape of the magnetic slot 243.

In some preferred embodiments of the present disclosure, the pattern layer 27 consists of a plurality of pattern pieces of different shapes spliced together, with the portion corresponding to the magnetic region 25 left open for the external magnetic device be able to fit closer to the magnetic region 25. And the plurality of the pattern pieces are provided with a location hole 271, a locating slot 241 is corresponding provided on the mounting frame 24. By bolting or screwing the location hole 271 directly into the locating slot 241, the pattern layer 27 can be positioned on the mounting frame 24.

It should be added that a cavity 245 is provided at the bottom of the mounting frame 24, and the cavity 245 is used for the light guide plate of the third light-emitting member 223 to be embedded so that the third light-emitting member 223 emits light under the mounting frame 24. The light emitted from the third light-emitting member 223 is transmitted through the mounting frame 24, the pattern layer 27 and the transparent cover 23, so as to provide a hazy light effect.

It should be added that a first through hole 242 is opened at the bottom of the mounting frame 24 near the second light-emitting member 222, the first through hole 242 is used for the light guide plate of the second light-emitting member 222 to be embedded and for the lug boss of the second light-emitting member 222 passes through. A second through hole 272 is opened on the pattern layer 27, which are also used for the lug boss to pass through. By such designs, a top of the lug boss is fitted to the transparent cover 23, so that the light emitted by the second light-emitting member 222 can be emitted from the lug boss through the transparent cover 23. The light guide plate of the second light-emitting member 222 located at the bottom of the mounting frame 24 can also emit light that through the mounting frame 24, the pattern layer 27 and the transparent cover 23, and the light guide plate cooperates with the lug boss, so that the light emitted by the second light-emitting member 222 has a layered sense.

Referring to FIG. 3 and FIG. 4, the PCB board is provided in two pieces, respectively including the first PCB board 22 and the second PCB board 35. When one of the PCB boards is damaged, there is no need to replace all the PCB boards, and the two PCB boards can be freely laid out, so that various functions reflect the best effect and save space.

Specifically, the two PCB boards are electrically connected by a conductive sheet 36, and a mounting chamber 14 is provided on the front side of the mobile phone case 1 adjacent to the camera opening 11, which is used for the second PCB board 35 be placed into, and the second PCB board is configured for mode switching and charging the power supply 26. The first PCB board is provided in the mounting groove 16, used for light display, a connecting slot 141 is configured between the mounting groove 16 and the mounting chamber 14, so that the conductive sheet 36 can conduct the two PCB boards via the connecting slot 141.

It should be noted that an opening of the mounting chamber 14 is provided on the front side of the mobile phone case 1, and a plurality of holes are opened at the bottom of the mounting chamber 14. The second PCB board 35 is electrically connected with a button 32, an indicator light 31 and a charging socket 33, and the button 32, the indicator light 31 and the charging socket 33 are exposed through the holes provided at the bottom of the mounting chamber 14, thus the button 32, the indicator light 31 and the charging socket 33 are exposed on the back of the mobile phone case 1. A hole corresponding to the charging socket 33 is provided on the top of the mobile phone case 1 to facilitate the user interaction. A lower cover 34 is covered on the opening of the mounting chamber 14, when the lower cover 34 is embedded into the mobile phone case 1, outer sides of the lower cover 34 is flush with the panel in the front of the mobile phone case 1.

In some embodiments of the present disclosure, the button 32 is configured for the second PCB board to issue instructions to control the light modes on the first PCB board 22, which includes, long press 2S to enter or close an energy-saving mode. The LED light 221 on the first PCB board 22 in the energy-saving mode only partially flashes or the flashing frequency is reduced, or the flashing duration and the flashing brightness can be reduced. The charging socket 33 may be a type-C connector or other power socket, such as a lightning socket. The charging socket 33 may be charged by an external power supply, or directly plugged with the mobile phone to get power.

It should be added that the indicator light 31 is arranged close to the button 32, which is used for prompting charging, and can also be used for mode indication, for example showing quantity of electricity of the power supply 26 by light, such as red corresponding to low power, green corresponding to sufficient power, and specifically when the power is less than 20% and also other thresholds such as 10%, 30%, and so on, it is lower power.

In some preferred embodiments of the present disclosure, the first PCB board is a flexible board to make the mobile phone case 1 bendable when it is a flexible material, so that it is convenient for the mobile phone case 1 to be putted on the mobile phone or be removed the mobile phone. The second PCB board is a hard board for the button 32 to be pressed and the charging socket 33 to be inserted more securely. A thickness of mobile phone case 1 located on the camera opening 11 is higher than that of the panel, thus a height of the second PCB board 35 is higher than that of the first PCB board 22. The first PCB board 22 has a Π shape, its centre is disposed the power supply 26 and the magnetic region 25, thus utilization of space inside the mobile phone case 1 can be improved.

The above description only for the purpose of illustrating the technical solutions of the present disclosure rather than limitation, other modifications or equivalent substitutions made to the technical solutions of the present disclosure by the person of ordinary skill in the art, as long as they do not deviate from the spirit and scope of the technical solutions of the present disclosure, should be covered by the scope of the claims of the present disclosure.

What is claimed is:

1. A mobile phone case with RGB light module, wherein a front side of the mobile phone case fits against a mobile phone, a sandwich layer is provided on a back of the mobile phone case, and the sandwich layer is provided with a light-emitting component;

wherein the light-emitting component comprises,

PCB boards;

light-emitting members, all electrically connected to the PCB boards, and light-emitting parts of the light-emitting members being disposed towards a back and a side of the mobile phone case; and a signal transceiver, electrically connected to the PCB boards and signal connected to a mobile phone signal; and wherein the signal transceiver is configured to receive command information of the mobile phone and send it to the PCB boards, and the PCB boards are configured to control light-emitting modes of all the light-emitting members via the command information;

wherein the back of the mobile phone case is provided with a mounting groove, the light-emitting components are assembled in the mounting groove, and the mounting groove is provided with a magnetic region used by an external electronic device to align a wireless charging area on the mobile phone for wireless charging; and wherein the PCB boards comprise a first PCB board, the first PCB board has a squared-off arch, rounded arch, gate, or table-like shape, and the magnetic regions are arranged inside the first PCB board.

2. The mobile phone case with RGB light module according to claim 1, wherein there are provided with three light-emitting members named a first light-emitting member, a second light-emitting member and a third light-emitting member; and a light-emitting part of the first light-emitting member is disposed towards the side of the mobile phone case, and light-emitting parts of the second and third light-emitting members are disposed towards the back of the mobile phone case.

3. The mobile phone case with RGB light module according to claim 2, wherein a light source of each light-emitting member is an LED light electrically connected to the PCB boards, and each light-emitting part is a light guide plate for converting a side light emitted by the LED light into an area light.

4. The mobile phone case with RGB light module according to claim 3, wherein one end of the light guide plate of the first light-emitting member is provided on the first PCB board and the other end is configured to extend out of the side of the mobile phone case.

5. The mobile phone case with RGB light module according to claim 1, wherein the signal transceiver is Bluetooth.

6. The mobile phone case with RGB light module according to claim 1, wherein the mounting groove is covered with a transparent cover covering the light-emitting component, and the transparent cover and the mounting groove are formed into the sandwich layer.

7. The mobile phone case with RGB light module according to claim 6, wherein the mounting groove is internally provided with a mounting frame, a pattern layer is arranged between the mounting frame and the transparent cover, so that a light emitted by the light-emitting component passes sequentially through the mounting frame, the pattern layer, and the transparent cover.

8. The mobile phone case with RGB light module according to claim 1, wherein the mounting groove is internally provided with a power supply electrically connected to the PCB boards, and the power supply is arranged inside the first PCB board.

9. The mobile phone case with RGB light module according to claim 8, wherein the mounting groove is internally provided with a mounting frame, and a power chamber is provided on the mounting frame.

10. The mobile phone case with RGB light module according to claim 1, wherein the magnetic region is a magnet.

11. The mobile phone case with RGB light module according to claim 1, wherein the PCB boards further comprise a second PCB board electrically connected to the first PCB board via a conductive sheet, the first PCB board is configured for light display, and the second PCB board is configured to control light modes on the first PCB board by issuing instructions.

12. The mobile phone case with RGB light module according to claim 1, wherein the mounting groove is internally provided with a mounting frame, and a magnetic slot is opened at a bottom of the mounting frame.

* * * * *